United States Patent [19]

Kaplan

[11] 4,082,467

[45] Apr. 4, 1978

[54] MARKER AND VAPORIZABLE DISPERSIBLE DYE INKS AND PROCESS FOR USING SAME

[76] Inventor: Paul Kaplan, 57 Lee Rd., Livingston, N.J. 07039

[21] Appl. No.: 645,756

[22] Filed: Dec. 31, 1975

[51] Int. Cl.² .................. B43K 5/00; C09D 11/00
[52] U.S. Cl. ..................... 401/199; 106/23; 260/33.6 R
[58] Field of Search .............. 401/199; 106/23; 260/33.6 R, 33.6 UA, 33.8 R, 33.8 UA, 42.54, 13, 16, 17 R

[56] References Cited

U.S. PATENT DOCUMENTS

| | | | |
|---|---|---|---|
| 3,369,543 | 2/1968 | Ronco | 401/199 X |
| 3,455,856 | 7/1969 | Voedisch et al. | 106/23 X |

*Primary Examiner*—Stephen C. Pellegrino
*Attorney, Agent, or Firm*—Blum, Moscovitz, Friedman & Kaplan

[57] ABSTRACT

Manually-prepared art work including indicia, art compositions, instructional material and decorative material in a wide variety of colors are prepared through the use of markers of the felt-tipped variety and inks compounded to be applicable by said markers. The inks contain volatile, dispersible dyes, and manually-prepared material in the form of compositions on appropriate paper is transferred to appropriate fabric by the application of heat and pressure. The fabrics are those which will accept volatile, dispersible dyes.

6 Claims, 1 Drawing Figure

U.S. Patent          April 4, 1978          4,082,467
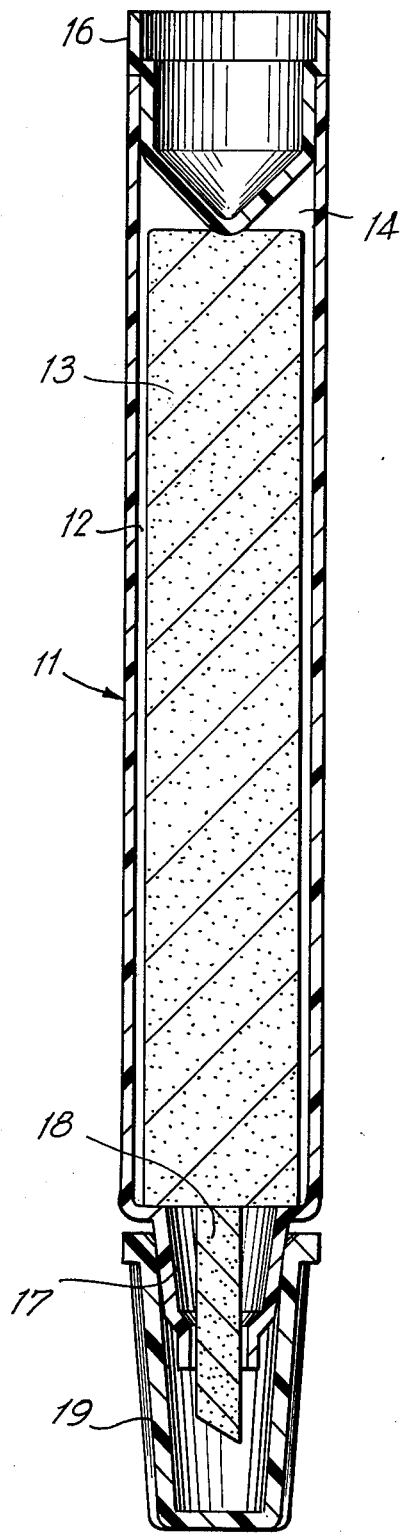

MARKER AND VAPORIZABLE DISPERSIBLE DYE INKS AND PROCESS FOR USING SAME

BACKGROUND OF THE INVENTION

The manufacture of fabrics decorated by transfer of designs printed with volatile, dispersible dyes is now widely practiced. In one embodiment of this practice, printing rolls using a variety of printing procedures such as flexography, screen-printing, etc., are used for printing on uncoated paper with an ink containing a volatile, dispersible dye, a resin binder and a solvent. Multi-colored art work can be prepared in this way on the uncoated stock. After the paper is dry, it is placed against the fabric to be printed and heated under sufficient pressure to hold the paper in close contact with the fabric. The fabric must be of the type which will accept the dye which is volatilized in the process. With close contact, the individual dots of half-tone printing can be transferred without loss of resolution.

The appropriate fabrics are the synthetics such as the linear polyesters, nylon and blends of wool and cotton with synthetics. There are also dispersible dyes which will react with cellulose but these are not widely used.

In accordance with the above embodiment of the process, the transfer from the paper to the fabric may take place continuously so that long stretches of fabric are prepared. Alternatively, the art work may be in the form of compositions of limited size and the printed paper is cut up so that each cut section contains a single composition. These compositions, which, in a way, resemble decalcomanias, are then distributed to establishments such as novelty stores which can apply any selected composition to a fabric chosen by the customer. The customer may bring in his own sweat shirt, for instance, or may buy one from the store. The store has a heated press for applying the art composition to the selected piece of wearing apparel or fabric.

As will be evident from the above description, the choice of art compositions to be applied to a fabric is limited by the choice of the printer who decides which art composition to prepare for sale. As a result, it is difficult, as matters stand now, for any individual to prepare his own design in the colors of his choice and then to apply this design to the fabric or piece of wearing apparel of his own choice. Obviously, it would be highly desirable to make such a choice available.

SUMMARY OF THE INVENTION

A marker has a hollow chamber which contains a pad which can hold a suspension of a dispersible dye. The chamber connects with an end of the marker which holds a porous tip through which suspension can flow, and which can be capped. For convenience said porous tip will be referred to as a felt tip. However, any tip which will provide a flow path from the interior of the marker to a substrate and which will form a line of a desired breadth may be used. Nylon tips are preferred. The pad, of an absorbent material, holds a dispersible dye solution of a composition such that it will feed readily at a controlled, selected rate through the felt tip when pressed against a substrate such as uncoated paper stock. The solution or suspension held in the marker includes a volatile, dispersible dye, a high boiling solvent and a binder resin. A wide variety of dyes suitable for use in such compositions is available and markers can be prepared to make available a correspondingly wide range of colors which can be applied in sequence so that manycolored designs can readily be prepared manually on appropriate sheet stock for transfer to fabrics.

Preferably the dye is of the high-energy type and the solvent has a minimum boiling point of at least 180° C.

The process of preparing a design on a fabric consists of the steps of drawing the design in the colors desired on paper, allowing the design to dry, placing the design, face down, against the fabric and heating the assembly of paper and fabric under pressure to a temperature sufficient for volatilizing the dye and transferring it to the fabric.

Accordingly, an object of the present invention is a composition containing a dispersible dye in suspension, said composition being suitable for application from a marker to paper as a step in preparing manually a design for transfer to a fabric by volatilization of the dye.

Another object of the present invention is the combination of a marker with a composition including a dispersible dye, the combination being suitable for applying a dispersible dye composition to a paper or other sheet stock as a step in the preparation of a fabric having an individualized, manually-prepared design thereon.

An important object of the present invention is a process for preparing manually designs in one or more colors on a fabric, the designs being formed of volatile, dispersible dyes.

Still other objects and advantages of the invention will in part be obvious and will in part be apparent from the specification.

The invention accordingly comprises the several steps and the relation of one or more of such steps with respect to each of the others, the composition possessing the features, properties, and the relation of constituents, and the combination of the article and the composition which possesses the characteristics, properties and relation of elements, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

The single FIGURE shows a marker containing a composition in accordance with the present invention.

DESCRIPTION OF THE PREFERRED EMBODIMENTS

As aforenoted, dispersible dye compositions suitable for printing by a variety of techniques are well known. Since, in accordance with the present invention, a dispersible dye composition is used in combination with a marker for preparing manually various types of designs at the selection of a user, it is necessary that the composition used in the marker be suitable for applications through a felt tip and yet have properties such that the dispersible dye will be held in suspension.

A wide variety of dispersible dyes is presently available. Such dyes are classified as either low energy, these transferring at up to about 375° F and high energy, these transferring at 400°–425° F. Since the major use for the designs prepared in accordance with the present invention involves personal wear, it is necessary that for such use, the dye be such that it will not resublime or ghost. Low energy dyes may release from the fabric at body temperature. Consequently, high energy dyes are preferred, but it is recognized that there are applications for which low energy dyes are satisfactory.

A typical dye dispersion in accordance with the present invention is conveniently prepared in two parts.

Part A

Dispersible Dye — 20-40 wt.%
Isophthalic alkyd — 40-50 wt.%
Low viscosity linseed oil (5-20 poises) — 10-20 wt.%

Part B

Solvent:
Petroleum fraction, turpentine, chlorinated hydrocarbons, esters. The initial boiling point should be at least 100° C and is preferably at least 180° C.

Ratio of Part B to Part A: 4:1 - 15:1.

The isophthalic alkyd is a resin binder and the solvent selected must be a solvent for the resin binder. The isophthalic alkyd is, of course, only an example. Many types of resin binders are suitable, the function of a resin binder being to hold the dye on the paper until such time as it is volatilized in transfer to a fabric. Other appropriate binders are cellulose ethers, hydroxyethyl cellulose, hydroxypropyl cellulose, hydroxypropyl cellulose, etc. Other solvents which may be used are alcohols and ketones.

The resin binder and the linseed oil serves to thicken the solution sufficiently so that the dispersible dye will be maintained in suspension. The solvent quantity is adjusted so that the composition will flow at the desired rate through a felt pen.

Water-based compositions as well as organic solvent-based compositions can also be used. Following is a sample composition of a water-dispersible system:

Dye — 1.5 - 2.0 wt. %
Resin — 1.5 - 2.0 wt. %
Water — 5 - 10 wt. %
Glycol — 80 - 90 wt. %

Suitable glycols are ethylene glycol, diethylene glycol, propylene glycol and dipropylene glycol.

In general, the viscosity range of dye dispersions whether aqueous or organic, should be between 20 and 100 centipoises. Suitable resins for thickening the aqueous solution are carboxymethyl cellulose and polyvinyl alcohol.

A marker for use in preparing designs by means of the compositions disclosed is shown in the single FIGURE. The marker pen is indicated generally by the reference numeral 11, and has a hollow chamber 12 containing an absorbent pad 13, generally of cotton. The pad may be non-woven or woven. Conveniently the marker has an opening 14 through which the pad 13 can be inserted and a cap 16 for closing the cavity 12. At the other end of cavity 12 is a channel 17 through which flows the ink to porous line-forming tip 18 and thence to the sheet stock, generally of paper, when the tip 18 is pressed thereagainst. When not in use, the tip 18 is enclosed by cover 19. A convenient material for the porous line-forming tip is nylon.

Such markers are widely available. Moreover, dispersible dyes are also widely available, Crompton and Knowles and American Cyanamid being particularly active in this field. The material of which the marker is made is selected to be inert to the solvent in which the dye is suspended.

To prepare a design, markers are filled with dyes of the colors desired and the various colors are applied to the sheet stock in sequence. Colors can be applied over each other, the resultant mixed colors following the usual rules. To transfer the design to a fabric, the sheet stock is placed under pressure against the fabric and the sheet stock is heated to volatilize the dye. Overheating of the fabric must be avoided. The preferred fabric is polyester because of the fact that resublimation or ghosting is minimized, and the resultant colors are more intense than with other fabrics. Other suitable fabrics are nylon and acrylic. Polyester-cotton blends as well as polyester-wool blends can be treated by this process but it is desirable that at least 50% of the fabric be of the polyester. The colors when transferred to nylon or acrylic are not so intense as when transferred to polyester.

As is evident, the design is reversed in the transfer process from the sheet stock to the fabric. Consequently, where letters are to be transferred, these must be written in reversed form in the design. Surprisingly, it has been found that a stamp pad can be impregnated with the compositions of subject invention and applied to sheet stock by means of a rubber stamp. It will be noted that a double reversal is involved, so that the rubber stamp reads from left to right instead of from right to left as is usually the case.

It has been found that designs can be prepared and stored for substantial periods of time; immediate transfer to a fabric is not necessary.

It is, of course, possible to suspend a plurality of dyes in making up a single composition, the objective being to obtain shades or hues not available with single dyes.

As can be seen, the present invention makes it possible for the creative individual to prepare designs which are absolutely unique both as to form and as to color, even gradations of color being achievable by the blending of dispersible dyes.

It will thus be seen that the objects set forth above, among those made apparent from the preceding description, are efficiently attained and, since certain changes may be made in carrying out the above process and the above compositions and the combination of the above compositions with the marker without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. The combination consisting of a marker pen suitable for use with a dye dispersion composition, comprising housing means having a chamber therein and an opening means connected with said chamber for transfer of said composition therebetween, an absorptive mass in said chamber for holding and supplying said dye dispersion composition and a line-forming tip closing said end, said line-forming tip having a porosity suitable for feeding said composition at a selected rate to a surface making contact with said tip and a dye dispersion composition comprising a high boiling solvent, a resin dissolved in said solvent and a vaporizable disperse dye suspended in said solvent, the viscosity of said composition being such that said dye will be held indefinitely in suspension and said composition can flow through a felt pen readily.

2. The combination as defined in claim 1, wherein said composition consists of a first part consisting of 20 - 40 wt. % of dispersed dye, 40 - 50 wt. % of soluble resin, and 10 - 20 wt. % of low viscosity linseed oil having a viscosity of 5 to 20 poises and a second part weighing from 4 to 15 times the weight of said first part, said second part being a member of the group of solvents consisting of a saturated paraffin, petroleum fraction, a naphthenate, turpentine, a chlorinated hydrocarbon, an olefin, an ester, an aromatic compound and mixtures thereof, each of said members having a boiling point of at least about 100° C.

3. The combination as defined in claim 2, wherein said soluble resin is a member selected from the group consisting of hydrogenated resin, ester gum, solid esters, cellulose ethers and isophthalic alkyd resin.

4. The combination as defined in claim 1, wherein said composition consists essentially of 1.5 to 2.0 wt % of a dispersible dye, dispersible in water, 1.5 to 2.0 wt. % of a water-soluble resin, 5 to 10 wt. % of water and 80 to 90 wt. % of a polyalcohol having a boiling point of at least about 180° C.

5. The combination as defined in claim 4, wherein said polyalcohol is selected from the group consisting of ethylene glycol, diethylene glycol, propylene glycol and dipropylene glycol.

6. The combination as defined in claim 4, wherein said water-soluble resin is selected from the group consisting of polyvinyl alcohol, carboxymethylcellulose and polyacrylates.

* * * * *